United States Patent
Tseng

(10) Patent No.: US 11,686,020 B2
(45) Date of Patent: Jun. 27, 2023

(54) REINFORCEMENT FABRIC, PROTECTION BOARD, AND METHOD FOR MANUFACTURING THE PROTECTION BOARD

(71) Applicant: Kai-Hsi Tseng, Changhua County (TW)

(72) Inventor: Kai-Hsi Tseng, Changhua County (TW)

(*) Notice: Subject to any disclaimer, the term of this patent is extended or adjusted under 35 U.S.C. 154(b) by 338 days.

(21) Appl. No.: 17/022,993

(22) Filed: Sep. 16, 2020

(65) Prior Publication Data

US 2020/0407878 A1 Dec. 31, 2020

Related U.S. Application Data

(63) Continuation-in-part of application No. 15/920,023, filed on Mar. 13, 2018, now abandoned.

(51) Int. Cl.
  *B29C 70/34* (2006.01)
  *D01F 11/06* (2006.01)
  *D06M 11/83* (2006.01)

(52) U.S. Cl.
  CPC .............. *D01F 11/06* (2013.01); *B29C 70/34* (2013.01); *D06M 11/83* (2013.01); *D10B 2331/10* (2013.01)

(58) Field of Classification Search
  CPC ......... B29C 70/40; B29C 70/42; B29C 70/46; B29C 70/34; B29C 70/345
  See application file for complete search history.

(56) References Cited

U.S. PATENT DOCUMENTS

| | | | |
|---|---|---|---|
| 4,457,985 A | 7/1984 | Harpell | |
| 4,501,856 A | 2/1985 | Harpell | |
| 4,613,535 A * | 9/1986 | Harpell | C08J 5/246 428/382 |
| 5,037,599 A | 8/1991 | Olson | |
| 2009/0025111 A1* | 1/2009 | Bhatnagar | B32B 5/28 2/2.5 |
| 2016/0288405 A1 | 10/2016 | Zawadka | |

* cited by examiner

*Primary Examiner* — Matthew J Daniels
(74) *Attorney, Agent, or Firm* — Muncy, Geissler, Olds & Lowe, P.C.

(57) ABSTRACT

Provided is a method for manufacturing a protection board. A reinforcement fabric including multiple reinforcement fibers is provided, each reinforcement fiber containing multiple adjacent filaments, each filament being composed of a core and a shell formed around the core, and a melting temperature of the shell is lower than a melting temperature of the core, the shell of each filament attached to the shell of the adjacent filament. The impact strength of the shell is higher than the impact strength of the core. The reinforcement fabric can be manufactured into a protection board with good impact resistance simply through heating and molding. Therefore, the reinforcement fabric has the advantage of both manufacturing a protection board with good impact resistance and reducing its process complexity and cost.

12 Claims, 8 Drawing Sheets

REINFORCEMENT FABRIC, PROTECTION BOARD, AND METHOD FOR MANUFACTURING THE PROTECTION BOARD

CROSS-REFERENCE TO RELATED APPLICATIONS

This application is a continuation-in-part (CIP) application of U.S. patent application Ser. No. 15/920,023, filed on Mar. 13, 2018, which is incorporated by reference in the present application in its entirety.

BACKGROUND OF THE INVENTION

1. Field of the Invention

The present invention relates to a reinforcement fabric, a protection board, and a method for manufacturing the protection board.

2. Description of the Prior Arts

Since objects are often damaged due to an external force either in use or during transport, and athletes are often injured due to an external force in training or competitions, the prior arts provide a variety of protection products, such as luggage and protective gears, for people to choose according to demand.

In the preparation of the protection equipment in the prior arts, a single material (e.g., polypropylene) is first made into a sheet. Multiple sheets are woven into a woven fabric, and then multiple woven fabrics are laminated and molded to obtain the protection products. However, the protection products made of a single material only have quite limited impact resistance. When the protection products in the prior arts are subjected to a large external force, they will be broken and lose their protective function, thereby causing damage to the objects and injury of the athletes.

In order to improve the impact resistance of the conventional protection products, a conventional solution is to place a reinforcing film between two adjacent woven fabrics, and then process molding to obtain another conventional protection product. However, the use of the reinforcing film increases the process complexity and production cost.

SUMMARY OF THE INVENTION

An objective of the present invention is to provide a reinforcement fabric. The reinforcement fabric can be simply molded into a protection board with good impact resistance, thereby reducing the process complexity and production cost of the protection board.

To achieve the foresaid objective, the present invention provides a reinforcement fabric comprising multiple reinforcement fibers. Each reinforcement fiber contains multiple adjacent filaments, and each filament is composed of a core and a shell formed around the core. A melting temperature of the shell is lower than a melting temperature of the core. The shell of each filament is attached to the shell of the adjacent filament. The impact strength of the shell is higher than the impact strength of the core.

Based on the above technical means, the reinforcement fabric can be manufactured into a protection board with good impact resistance simply through heating and molding without using any reinforcing film. Therefore, the reinforcement fabric has the advantages of both manufacturing a protection board with good impact resistance and reducing the process complexity and production cost.

The core is made of polypropylene copolymers or polypropylene homopolymers, and the shell is made of polyethylene copolymers, polyethylene homopolymers, polypropylene copolymers or polypropylene homopolymers.

The melting temperature of the core is between 160° C. and 180° C. and the melting temperature of the shell is between 120° C. and 150° C.

Another objective of the present invention is to provide a protection board with good impact resistance.

To achieve the objective, the present invention provides a protection board made of the foresaid reinforcement fabric. The protection board comprises a base, multiple reinforced portions and a thermoplastic polyurethane layer. The base is made of the shell of the filaments in the reinforcement fiber. The reinforced portions are arranged at spaced intervals in the base. Each reinforced portion comprises multiple cores, and the base tightly coats the cores of the filaments. The thermoplastic polyurethane layer is made of a thermoplastic polyurethane and coated on a surface of the base. The impact strength of the shell is higher than the impact strength of the core.

Based on the above technical means, the protection board of the present invention can both have good structural strength and resist an external force without using any reinforcing film. Also, the protection board can be easily printed with ink.

The protection board also comprises a decoration layer bonded to the surface of the base.

The decoration layer is made of polyethylene, polypropylene, poly(ethylene terephthalate), polystyrene or polyethylene terephthalate.

Another objective of the present invention is to provide a method for manufacturing a protection board, comprising: a step of providing a raw fabric made of a reinforcement fabric; a step of heating the raw fabric to melt the shell to obtain a melted raw fabric; a step of molding the melted raw fabric to obtain a raw protection board; and a step of applying a thermoplastic polyurethane to a surface of the raw protection board to obtain the protection board. The reinforcement fabric comprises multiple reinforcement fibers, each reinforcement fiber contains multiple adjacent filaments, and each filament is composed of a core and a shell formed around the core. A melting temperature of the shell is lower than a melting temperature of the core, and the shell of each filament is attached to the shell of the adjacent filament, and the impact strength of the shell is higher than the impact strength of the core. The protection board comprises a base, multiple reinforced portions and a thermoplastic polyurethane layer. The base is made of the shell of the filaments in the reinforcement fiber. The reinforced portions are arranged at spaced intervals in the base. Each reinforced portion comprises multiple cores, and the base tightly coats the cores of the filaments. The thermoplastic polyurethane layer is made of the thermoplastic polyurethane and coated on a surface of the base.

Based on the above technical means, the protection board manufactured by foresaid method can have good impact resistance simply through heating and molding without using any reinforcing film. Also, the protection board can be easily printed with ink. Therefore, the protection board manufactured by foresaid method has the advantages of good impact resistance, ease for ink printing and simplified manufacturing process. In addition, as the step of applying thermoplastic polyurethane is after the raw protection board is formed, the foresaid method for manufacturing the protection board is suitable for massive production of the protection board in a simple shape.

Preferably, the step of molding the melted raw fabric to obtain a raw protection board comprises a step of molding the melted raw fabric to obtain an untreated protection board; and a step of depositing aluminum on a surface of the untreated protection board to obtain the raw protection board. With the technical feature of depositing aluminum to form an aluminum film within the protection board, the protection board can further have the advantage of preventing electromagnetic interference (EMI).

Preferably, the step of providing the foresaid raw fabric made of the reinforcement fabric comprises a step of laminating multiple reinforcement fabrics to obtain the raw fabric.

Preferably, the step of laminating multiple reinforcement fabrics to obtain the raw fabric comprises a step of depositing aluminum on a surface of each of the reinforcement fabrics to obtain multiple treated reinforcement fabrics; and a step of laminating the multiple treated reinforcement fabrics to obtain the raw fabric.

Preferably, the step of heating the raw fabric to melt the shell to obtain a melted raw fabric comprises a step of putting the raw fabric to a mold; and a step of heating the raw fabric through the mold to melt the shells of the filaments of the reinforcement fibers of the reinforcement fabric, so as to obtain the melted raw fabric; and the step of molding the melted raw fabric to obtain a raw protection board comprises a step of press-molding the melted raw fabric to obtain the raw protection board.

Preferably, the step of molding the melted raw fabric to obtain a raw protection board comprises a step of putting the melted raw fabric to a mold; and a step of press-molding the melted raw fabric to obtain the raw protection board.

Another objective of the present invention is to provide a method for manufacturing a protection board, comprising: a step of providing a raw fabric made of a reinforcement fabric, a step of applying a thermoplastic polyurethane to a surface of the raw fabric to obtain a coated raw fabric, a step of heating the coated raw fabric to melt the shell to obtain a melted raw fabric and a step of molding the melted raw fabric to obtain the protection board. The reinforcement fabric comprises multiple reinforcement fibers, each reinforcement fiber contains multiple adjacent filaments, and each filament is composed of a core and a shell formed around the core. A melting temperature of the shell is lower than a melting temperature of the core, and the shell of each filament is attached to the shell of the adjacent filament, and the impact strength of the shell is higher than the impact strength of the core. The protection board comprises a base, multiple reinforced portions and a thermoplastic polyurethane layer. The base is made of the shell of the filaments in the reinforcement fiber. The reinforced portions are arranged at spaced intervals in the base. Each reinforced portion comprises multiple cores, and the base tightly coats the cores of the filaments. The thermoplastic polyurethane layer is made of the thermoplastic polyurethane and coated on a surface of the base.

Based on the above technical means, the protection board manufactured by foresaid method has the advantages of good impact resistance, ease for ink printing and simplified manufacturing process. In addition, as the thermoplastic polyurethane is applied to the raw fabric and is before the raw protection board is formed, the foresaid method for manufacturing the protection board is suitable for any specific shape of the protection board due to the flexibility of the raw fabric.

Preferably, the step of providing a raw fabric made of a reinforcement fabric comprises a step of depositing aluminum on a surface of the reinforcement fabric to obtain the raw fabric.

Preferably, the step of providing a raw fabric made of a reinforcement fabric comprises a step of laminating multiple said reinforcement fabrics to obtain the raw fabric.

Preferably, the step of heating the coated raw fabric to melt the shell to obtain a melted raw fabric comprises a step of putting the coated raw fabric to a mold; and a step of heating the coated raw fabric through the mold to melt the shells of the filaments of the reinforcement fibers of the reinforcement fabric, so as to obtain the melted raw fabric; and the step of molding the melted raw fabric to obtain the protection board comprises a step of press-molding the melted raw fabric to obtain the protection board.

Preferably, the step of molding the melted raw fabric to obtain the protection board comprises a step of putting the melted raw fabric to a mold; and a step of press-molding the melted raw fabric to obtain the protection board.

By way of using the foresaid reinforcement fabric as a raw material, the protection board can be manufactured simply through heating and molding without using any reinforcing film, and also can be easily printed with ink. Therefore, the method for manufacturing the protection board has the advantage of both low process complexity and low production cost.

Other objectives, advantages and novel features of the invention will become more apparent from the following detailed description when taken in conjunction with the accompanying drawings without limiting the scope of the invention.

DETAILED DESCRIPTION OF THE PREFERRED EMBODIMENTS

In order to illustrate the technical means adopted by the present invention to achieve the predetermined objective, the preferred embodiments of the present invention will be further described in detail below with reference to the drawings.

Figure 1:
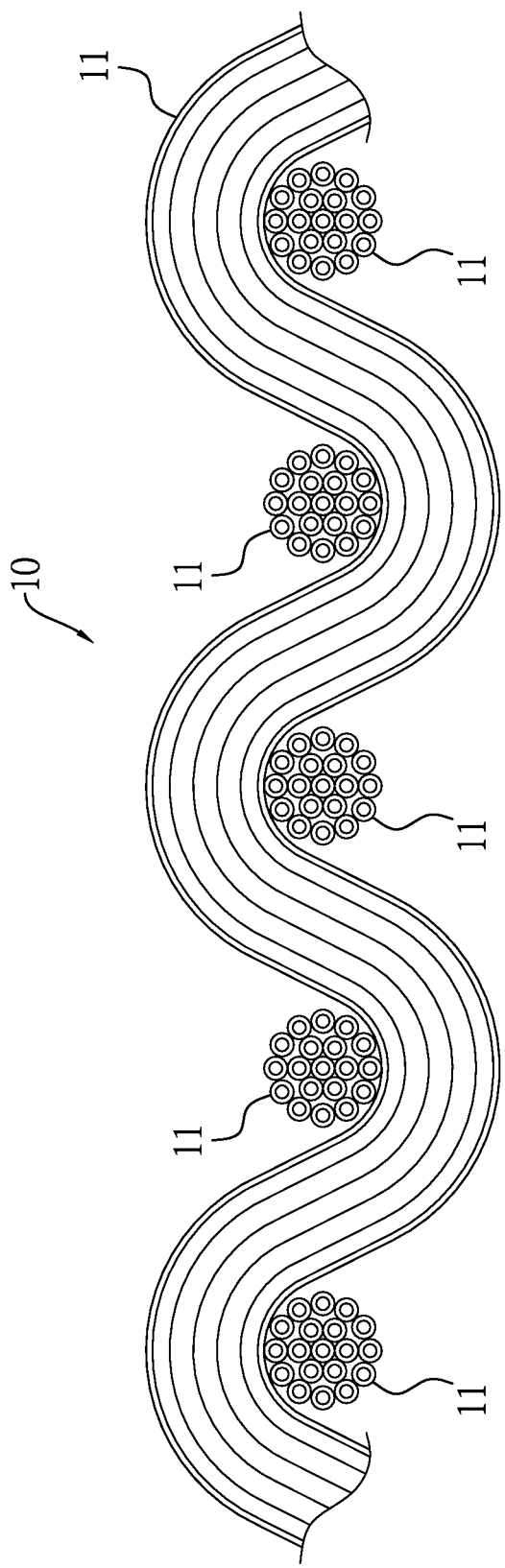
FIG. 1 is a cross-sectional side view of a reinforcement fabric of the present invention.
Figure 2:
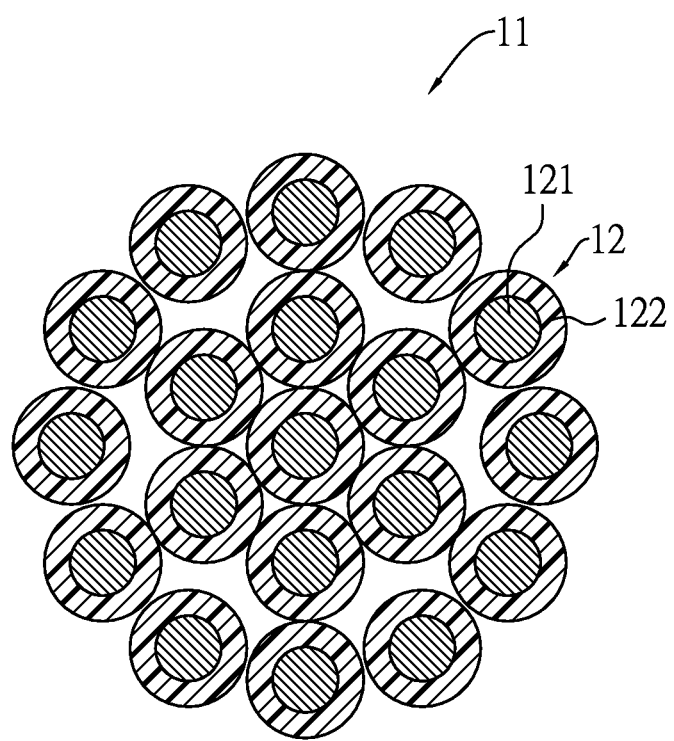
FIG. 2 is a sectional view of a reinforcement fiber of the reinforcement fabric of the present invention.
Figure 3:
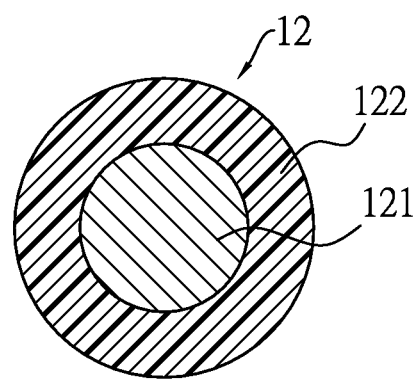
FIG. 3 is a sectional view of a reinforcement fiber filament of the reinforcement fabric of the present invention.

As illustrated in FIG. 1 to FIG. 3, the reinforcement fabric 10 of the present invention is woven by multiple reinforcement fibers 11. Each reinforcement fiber 11 is composed of multiple adjacent filaments 12, which are gathered into bundles. In other words, each reinforcement fiber 11 is a single bundle of filaments 12. Each filament 12 is a round bar and is composed of a core 121 and a shell 122. The core 121 is a round bar and the shell 122 is formed around the core 121, and a melting temperature of the shell 122 is lower than a melting temperature of the core 121, and the impact strength of the shell 122 is higher than the impact strength of the core 121. The shell 122 of each filament 12 is attached to the shell 122 of an adjacent filament. In addition, each reinforcement fiber 11 is substantially a round bar.

In a preferred embodiment, the core 121 is made of polypropylene copolymers or polypropylene homopolymers, while the shell 122 is made of polyethylene copolymers, polyethylene homopolymers, polypropylene copolymers or polypropylene homopolymers. More specifically, the melting temperature of the polyethylene copolymer, polyethylene homopolymer, polypropylene copolymer, and polypropylene homopolymer for the shell 122 is lower than the melting temperature of the polypropylene copolymer and polypropylene homopolymer for the core 121. In other words, the polyethylene copolymer, polyethylene homopolymer, polypropylene copolymer and polypropylene homopolymer for the shell 122 are low-melting point polyethylene copolymer, low-melting-point polyethylene homopolymer, low-melting point polypropylene copolymer and low-melting point polypropylene homopolymer respectively, while the polypropylene copolymer and polypropylene homopolymer for the core 121 are high-melting point polypropylene copolymer and high-melting point polypropylene homopolymer respectively. In a preferred embodiment, the melting temperature of the core 121 is between 160° C. and 180° C. and the melting temperature of the shell 122 is between 120° C. and 140° C. In a preferred embodiment, the reinforcement fabric 10 is woven from the reinforcement fibers 11 and multiple reinforcing fibers. The materials of the reinforcing fibers are different from those of the reinforcement fibers 11. For example, the reinforcing fibers may be aramid fibers.

Figure 4:
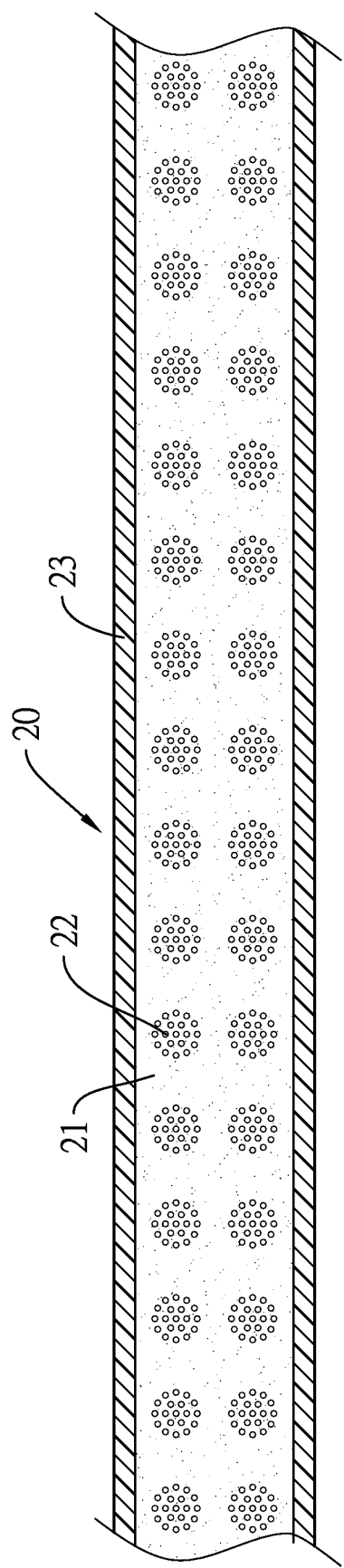
FIG. 4 is a cross-sectional side view of a protection board in a preferred embodiment of the present invention.
Figure 5:
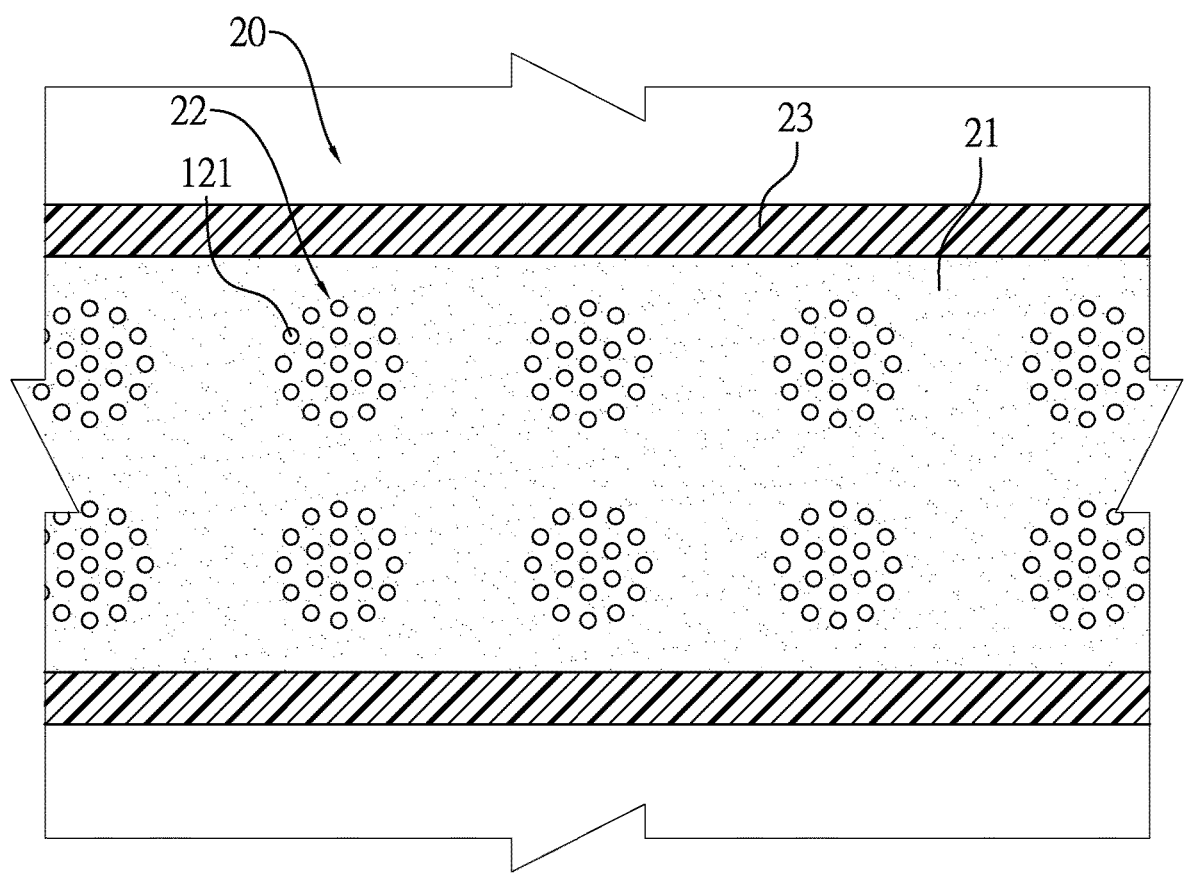
FIG. 5 is a partially enlarged view of FIG. 4.

As illustrated in FIG. 4 and FIG. 5, the reinforcement fabric 10 can be made into a protection board 20. The protection board 20 comprises a base 21, multiple reinforced portions 22 and a thermoplastic polyurethane layer 23 bonded to the surface of the base 21. The base 21 is constructed by the shell 122 of the filaments 12, the reinforced portions 22 are arranged at spaced intervals in the base 21, and the reinforced portions 22 comprise multiple cores 121, the melting point of each core 121 being higher than the melting point of the base 21. The impact strength of the shell 122 is higher than the impact strength of the cores 121. In a preferred embodiment, the thickness of the protection board 20 is 0.3 mm to 2 mm.

Figure 6:
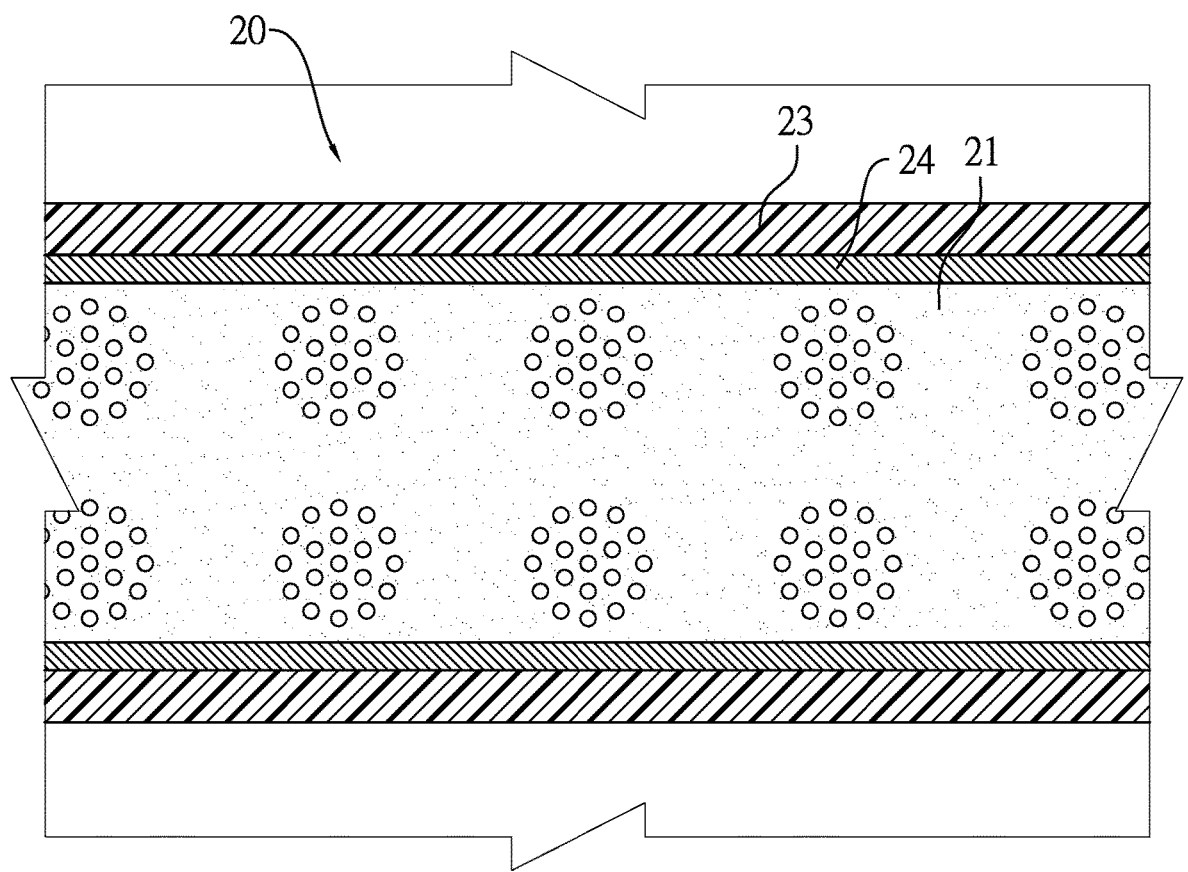
FIG. 6 is a cross-sectional side view of a protection board in another preferred embodiment of the present invention.

In another preferred embodiment as illustrated in FIG. 6, the protection board 20 also comprises an aluminum film 24 formed between the base 21 and the thermoplastic polyurethane layer 23.

Figure 7:
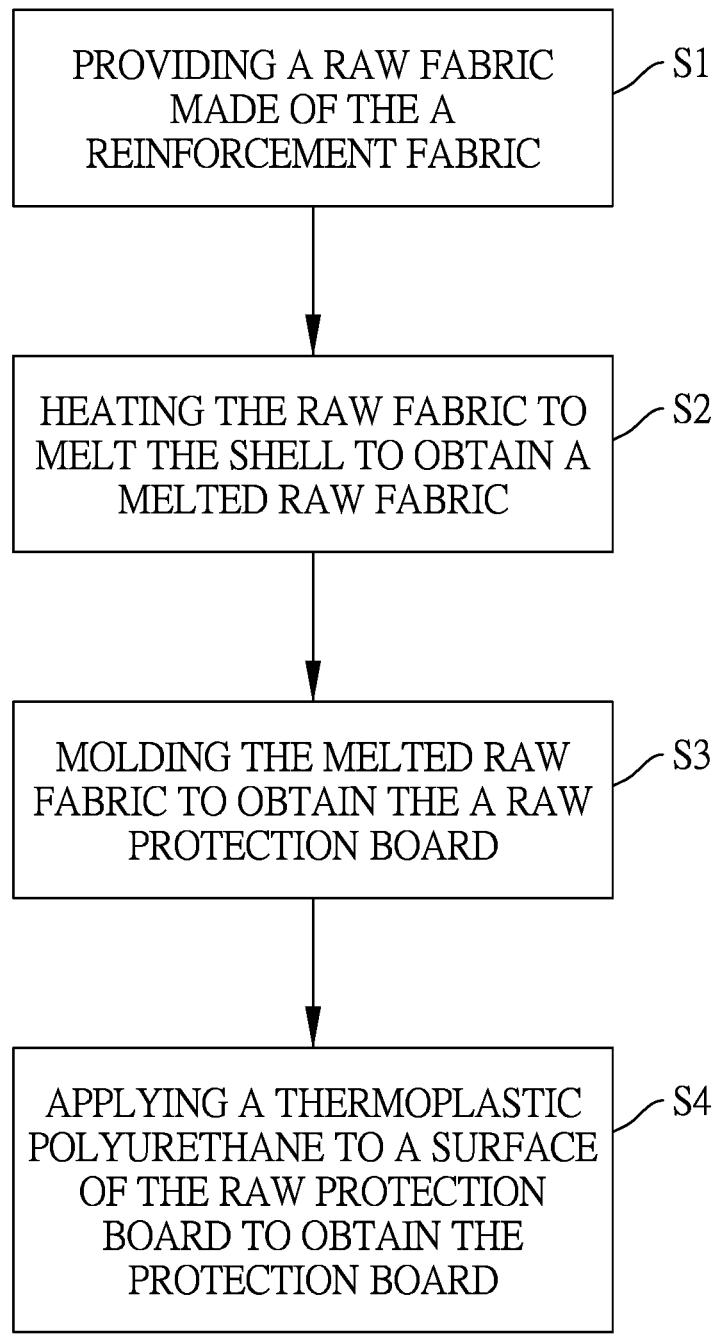
FIGS. 7 and 8 are respectively a flow chart of the method of manufacturing the protection board of the present invention.

As illustrated in FIG. 7, the method for manufacturing the protection board 20 from the reinforcement fibers comprises: a step S1 of providing a raw fabric made of the reinforcement fabric 10; a step S2 of heating the raw fabric to melt the shell 122, and thus obtaining a melted raw fabric; a step S3 of molding the melted raw fabric to obtain a raw protection board; and a step S4 of applying a thermoplastic polyurethane to a surface of the raw protection board to obtain the protection board 20. In a preferred embodiment, the raw fabric is a reinforcement fabric 10. In another preferred embodiment, the raw fabric is formed by laminating multiple said reinforcement fabrics 10 as stated above.

Figure 8:
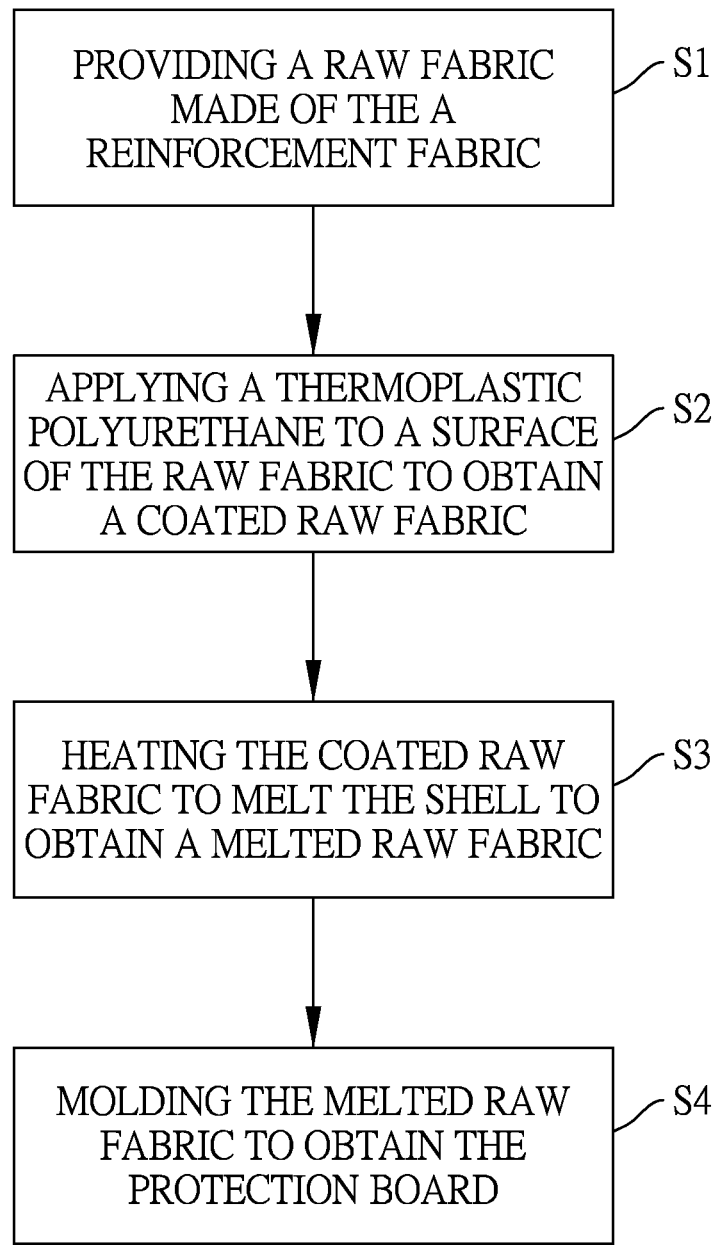

As illustrated in FIG. 8, said another method for manufacturing the protection board 20 from the reinforcement fibers comprises: a step S1 of providing a raw fabric made of the reinforcement fabric 10; a step S2 of applying a thermoplastic polyurethane to a surface of the raw fabric to obtain a coated raw fabric; a step S3 of heating the coated raw fabric to melt the shell 122, and thus obtaining a melted raw fabric; and a step S4 of molding the melted raw fabric to obtain the protection board 20. In a preferred embodiment, the raw fabric is a reinforcement fabric 10. In another preferred embodiment, the raw fabric is formed by laminating multiple said reinforcement fabrics 10 as stated above.

Preparation Example 1: Preparation of Protection Board 20

Multiple reinforcement fabrics 10 were laminated to obtain a raw fabric. Thereafter, the raw fabric was heated by infrared rays at a heating temperature of 155° C. for 3 minutes to melt the shell 122 of the filament 12 of the reinforcement fiber 11 in the reinforcement fabric 10 to obtain a melted raw fabric. Subsequently, the melted raw fabric was put into a mold at room temperature and pressed under a pressure of 6 MPa for 1 minute by a press machine, and then released from the mold to obtain a raw protection board. Afterward, thermoplastic polyurethane was applied to a surface of the raw protection board to obtain the protection board 20.

In the present preparation example, the melting temperature of the shell 122 of the filament 12 in each reinforcement fabric 10 was 150° C., the melting temperature of the core 121 of the filament 12 in each reinforcement fabric 10 was 170° C., and the thickness of the protection board 20 was 1 mm. The shell 122 was made of polyethylene and the core 121 was made of polypropylene.

Preparation Example 2: Preparation of Protection Board 20

The preparation of the protection board 20 in the present preparation example was similar to the preparation of the protection board 20 in Preparation Example 1, except that the raw fabric was heated by a halogen lamp to obtain a melted raw fabric in the present preparation example.

Preparation Example 3: Preparation of Protection Board 20

Multiple reinforcement fabrics 10 were laminated to obtain a raw fabric. Thereafter, the raw fabric was placed in a mold at a heating temperature of 155° C. for 1 minute to melt the shell 122 of the filament 12 of the reinforcement fiber 11 in the reinforcement fabric 10 to obtain a melted raw fabric. Subsequently, the melted raw fabric was put into a mold at room temperature and pressed under a pressure of 6 MPa for 20 seconds to 40 seconds by a press machine, and then released from the mold to obtain a raw protection board. Afterward, thermoplastic polyurethane was applied to a surface of the raw protection board to obtain the protection board 20.

In the present preparation example, the melting temperature of the shell 122 of the filament 12 in each reinforcement fabric 10 was 150° C., the melting temperature of the core 121 of the filament 12 in each reinforcement fabric 10 was 170° C., and the thickness of the protection board 20 was 0.6 mm. The shell 122 was made of polyethylene and the core 121 was made of polypropylene.

Preparation Example 4: Preparation of Protection Board 20

Multiple reinforcement fabrics 10 were laminated to obtain a raw fabric. Thereafter, the raw fabric was heated by infrared rays at a heating temperature of 155° C. for 1 minute to melt the shell 122 of the filament 12 of the reinforcement fiber 11 in the reinforcement fabric 10 to obtain a melted raw fabric. Subsequently, the melted raw fabric was put into a mold at room temperature and pressed under a pressure of 6 MPa for 20 seconds to 40 seconds by a press machine, and then released from the mold to obtain an untreated protection board. Then, aluminum was deposited on a surface of the untreated board to obtain a raw protection board. Afterward, thermoplastic polyurethane was applied to a surface of the raw protection board to obtain the protection board 20.

In the present preparation example, the melting temperature of the shell 122 of the filament 12 in each reinforcement fabric 10 was 150° C., the melting temperature of the core 121 of the filament 12 in each reinforcement fabric 10 was 170° C., and the thickness of the protection board 20 was 0.6 mm. The shell 122 was made of polyethylene and the core 121 was made of polypropylene.

Preparation Example 5: Preparation of Protection Board 20

Multiple reinforcement fabrics 10 were laminated to obtain a raw fabric. Then, thermoplastic polyurethane was applied to a surface of the raw fabric to obtain a coated raw fabric. Thereafter, the coated raw fabric was heated by infrared rays at a heating temperature of 155° C. for 1 minute to melt the shell 122 of the filament 12 of the reinforcement fiber 11 in the reinforcement fabric 10 to obtain a melted raw fabric. Subsequently, the melted raw fabric was put into a mold at room temperature and pressed under a pressure of 6 MPa for 20 seconds to 40 seconds by a press machine, and then released from the mold to obtain the protection board 20.

In the present preparation example, the melting temperature of the shell 122 of the filament 12 in each reinforcement fabric 10 was 150° C., the melting temperature of the core 121 of the filament 12 in each reinforcement fabric 10 was 170° C., and the thickness of the protection board 20 was 0.6 mm. The shell 122 was made of polyethylene and the core 121 was made of polypropylene.

Preparation Example 6: Preparation of Protection Board 20

Aluminum was deposited on a surface of the reinforcement fabric 10 and multiple said reinforcement fabrics 10 were laminated to obtain a raw fabric. Then, thermoplastic polyurethane was applied to a surface of the raw fabric to obtain a coated raw fabric. Thereafter, the coated raw fabric was heated by infrared rays at a heating temperature of 155° C. for 1 minute to melt the shell 122 of the filament 12 of the reinforcement fiber 11 in the reinforcement fabric 10 to obtain a melted raw fabric. Subsequently, the melted raw fabric was put into a mold at room temperature and pressed under a pressure of 6 MPa for 20 seconds to 40 seconds by a press machine, and then released from the mold to obtain the protection board 20.

In the present preparation example, the melting temperature of the shell 122 of the filament 12 in each reinforcement fabric 10 was 150° C., the melting temperature of the core 121 of the filament 12 in each reinforcement fabric 10 was 170° C., and the thickness of the protection board 20 was 0.6 mm. The shell 122 was made of polyethylene and the core 121 was made of polypropylene.

As can been seen from above, the reinforcement fabric 10 is made of the reinforcement fibers 11, each reinforcement fiber 11 is composed of multiple filaments 12, and the melting temperature of the shell 122 of each filament 12 is lower than the melting temperature of the core 121 of each filament 12, so the reinforcement fabric 10 can be directly heated to melt the shell 122 of each filament 12 while the core 121 of each filament 12 is not melted and then molded to be the protection board 20, wherein the shell 122 of the filaments 12 in the reinforcement fiber 11 is melted and bonded to a base 21 solidified into the protection board 20, and the base 21 of the protection board 20 tightly coats the core 121 of the filaments 12 in the reinforcement fiber 11. Because the core 121 of each filament 12 is not melted during the process of manufacturing the protection board 20, the impact strength of the core 121 of each filament 12 is maintained, so as to enhance the overall structural strength of the protection board 20.

Therefore, the reinforcement fabric 10 can be manufactured into a protection board 20 with good impact resistance simply through heating and molding without a reinforcing film, thereby reducing the process complexity and production cost of the protection board 20.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A method for manufacturing a protection board, comprising steps of:
   providing a raw fabric made of a reinforcement fabric, the reinforcement fabric comprising multiple reinforcement fibers, each reinforcement fiber containing multiple adjacent filaments, each filament composed of a core and a shell formed around the core, a melting temperature of the shell being lower than a melting temperature of the core, and the shell of each filament attached to the shell of the adjacent filament, and the impact strength of the shell being higher than the impact strength of the core;
   heating the raw fabric to melt the shell to obtain a melted raw fabric;
   molding the melted raw fabric to obtain an untreated protection board;
   depositing aluminum on a surface of the untreated protection board to obtain a raw protection board; and
   applying a thermoplastic polyurethane to a surface of the raw protection board to obtain the protection board;
   wherein the protection board comprises:
   a base made of the shells of the filaments in the reinforcement fiber;
   multiple reinforced portions arranged at spaced intervals in the base, and each reinforced portion comprising the cores of the reinforcement fibers of the reinforcement fabric; and
   a thermoplastic polyurethane layer, made by the thermoplastic polyurethane and coated on a surface of the base.

2. The method for manufacturing the protection board as claimed in claim 1, wherein the step of providing a raw fabric made of a reinforcement fabric comprises a step of laminating multiple said reinforcement fabrics to obtain the raw fabric.

3. The method for manufacturing the protection board as claimed in claim 1, wherein the core is made of polypropylene copolymers or polypropylene homopolymers, and the shell is made of polyethylene copolymers, polyethylene homopolymers, polypropylene copolymers or polypropylene homopolymers.

4. The method for manufacturing the protection board as claimed in claim 1, wherein the melting temperature of the core is between 160° C. and 180° C. and the melting temperature of the shell is between 120° C. and 150° C.

5. The method for manufacturing the protection board as claimed in claim 1, wherein the step of heating the raw fabric to melt the shell to obtain a melted raw fabric comprises steps of:
putting the raw fabric to a mold; and
heating the raw fabric through the mold to melt the shells of the filaments of the reinforcement fibers of the reinforcement fabric, so as to obtain the melted raw fabric; and
the step of molding the melted raw fabric to obtain an untreated protection board comprises a step of press-molding the melted raw fabric to obtain the untreated protection board.

6. The method for manufacturing the protection board as claimed in claim 1, wherein the step of molding the melted raw fabric to obtain an untreated protection board comprises steps of:
putting the melted raw fabric to a mold; and
press-molding the melted raw fabric to obtain the untreated protection board.

7. A method for manufacturing a protection board, comprising steps of:
depositing aluminum on a surface of a reinforcement fabric and providing a raw fabric made of the reinforcement fabric, the reinforcement fabric comprising multiple reinforcement fibers, each reinforcement fiber containing multiple adjacent filaments, each filament composed of a core and a shell formed around the core, a melting temperature of the shell being lower than a melting temperature of the core, and the shell of each filament attached to the shell of the adjacent filament, and the impact strength of the shell being higher than the impact strength of the core;
applying a thermoplastic polyurethane to a surface of the raw fabric to obtain a coated raw fabric;
heating the coated raw fabric to melt the shell to obtain a melted raw fabric; and
molding the melted raw fabric to obtain the protection board;
wherein the protection board comprises:
a base made of the shells of the filaments in the reinforcement fiber;
multiple reinforced portions arranged at spaced intervals in the base, and each reinforced portion comprising the cores of the reinforcement fibers of the reinforcement fabric; and
a thermoplastic polyurethane layer, made by the thermoplastic polyurethane and coated on a surface of the base.

8. The method for manufacturing the protection board as claimed in claim 7, wherein the step of providing a raw fabric made of the reinforcement fabric comprises a step of laminating multiple said reinforcement fabrics to obtain the raw fabric.

9. The method for manufacturing the protection board as claimed in claim 7, wherein the core is made of polypropylene copolymers or polypropylene homopolymers, and the shell is made of polyethylene copolymers, polyethylene homopolymers, polypropylene copolymers or polypropylene homopolymers.

10. The method for manufacturing the protection board as claimed in claim 7, wherein the melting temperature of the core is between 160° C. and 180° C. and the melting temperature of the shell is between 120° C. and 150° C.

11. The method for manufacturing the protection board as claimed in claim 7, wherein the step of heating the coated raw fabric to melt the shell to obtain a melted raw fabric comprises steps of:
putting the coated raw fabric to a mold; and
heating the coated raw fabric through the mold to melt the shells of the filaments of the reinforcement fibers of the reinforcement fabric, so as to obtain the melted raw fabric; and
the step of molding the melted raw fabric to obtain the protection board comprises a step of press-molding the melted raw fabric to obtain the protection board.

12. The method for manufacturing the protection board as claimed in claim 7, wherein the step of molding the melted raw fabric to obtain the protection board comprises steps of:
putting the melted raw fabric to a mold; and
press-molding the melted raw fabric to obtain the protection board.

* * * * *